United States Patent
Craig et al.

(10) Patent No.: US 7,350,973 B2
(45) Date of Patent: Apr. 1, 2008

(54) COLOR CHANGING THERMOMETER

(75) Inventors: Christopher Craig, New York, NY (US); Stephen Russak, Demarest, NJ (US); Andrew P. Howansky, Copake Falls, NY (US)

(73) Assignee: Kaz, Incorporated, New York, NY (US)

( * ) Notice: Subject to any disclaimer, the term of this patent is extended or adjusted under 35 U.S.C. 154(b) by 0 days.

(21) Appl. No.: 11/426,203

(22) Filed: Jun. 23, 2006

(65) Prior Publication Data

US 2006/0291535 A1 Dec. 28, 2006

Related U.S. Application Data

(60) Provisional application No. 60/748,695, filed on Dec. 7, 2005, provisional application No. 60/693,948, filed on Jun. 24, 2005.

(51) Int. Cl.
*G01K 11/12* (2006.01)
*A61B 5/01* (2006.01)

(52) U.S. Cl. ............... 374/162; 340/584; 600/549

(58) Field of Classification Search ......... 340/548, 340/584; 374/173, 160–162; 600/549, 474
See application file for complete search history.

(56) References Cited

U.S. PATENT DOCUMENTS

| | | | | |
|---|---|---|---|---|
| 3,704,625 A | * | 12/1972 | Seto et al. ............ | 374/162 |
| 4,859,360 A | * | 8/1989 | Suzuki et al. ......... | 252/299.7 |
| 4,962,765 A | * | 10/1990 | Kung et al. ........... | 600/549 |
| 4,994,792 A | * | 2/1991 | Ziegler, Jr. ........... | 340/584 |
| 5,486,810 A | * | 1/1996 | Schwarz ............... | 340/521 |
| 5,676,465 A | * | 10/1997 | Witonsky et al. ...... | 374/162 |
| 5,829,878 A | * | 11/1998 | Weiss et al. .......... | 374/163 |
| 6,890,096 B2 | * | 5/2005 | Tokita et al. .......... | 374/163 |
| 2001/0040911 A1 | * | 11/2001 | Rubenstein ........... | 374/141 |
| 2003/0130590 A1 | * | 7/2003 | Bui et al. .............. | 600/537 |
| 2007/0071066 A1 | * | 3/2007 | Weng et al. ........... | 374/163 |

FOREIGN PATENT DOCUMENTS

WO          WO 90/10854       * 9/1990

\* cited by examiner

*Primary Examiner*—G. Bradley Bennett
(74) *Attorney, Agent, or Firm*—Darby & Darby P.C.

(57) ABSTRACT

The invention includes a thermometer with a backlight and a method for lighting the backlight. The thermometer has temperature sensing tip, a processor taking temperature readings and determining a sensed temperature reading of the living being from the temperature sensing tip. The thermometer also includes a display and a backlight for lighting the display. The backlight is activated upon a command from the processor and the processor determines whether a decrease in the temperature readings exceeds or is equal to a predetermined threshold in order to activate the backlight. The method embodiment can includes the steps of using the processor to monitor a temperature change indicated by a temperature sensing element. The processor then detects a temperature decrease and activates a first color light emitting element to backlight a display if the temperature decrease exceeds or equals a predetermined threshold.

15 Claims, 8 Drawing Sheets

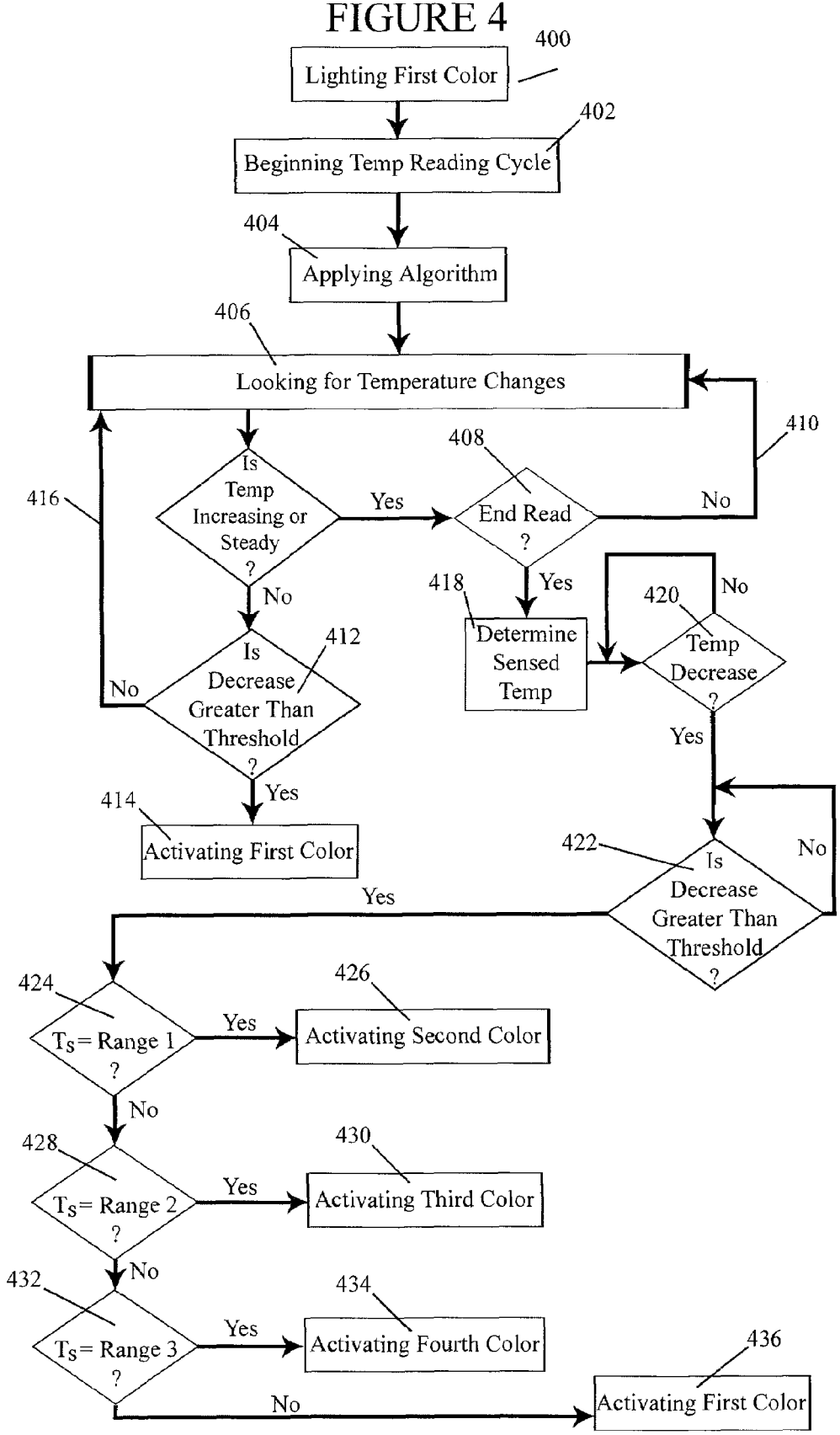

COLOR CHANGING THERMOMETER

BACKGROUND OF THE INVENTION

1. Field of the Invention

The present invention relates to an electronic thermometer for detecting and visually displaying ranges of body temperature. More particularly, the present invention pertains to a clinical thermometer with one or more visual indicators.

2. Discussion of the Related Art

There are multiple types of thermometers, including hand held electronic thermometers and glass-tube mercury thermometers. The glass-tube mercury thermometers have gradated scales colored or etched into the glass tube and once the mercury rises and settles in the glass tube due to the temperature of the patient, a user can read the temperature from the scale, calibrated for Fahrenheit or Centigrade. Glass-tube thermometers have a number of drawbacks, including the difficulty of reading a temperature from the gradated scale based on the mercury level.

As an improvement, hand held electronic thermometers have been introduced. In the basic electronic thermometer design, a temperature sensing element is connected to a combined, battery-powered computing and display element. The display element is typically a viewing window provided for the temperature display wherein the temperature is displayed numerically in either Fahrenheit or Centigrade. The multi-segment liquid crystal display (LCD) displays of the electronic thermometers are simple to read and can provide a patient's temperature in tenths of a degree.

However, regardless of the means to display the patient's temperature, the user still must remember the proper temperature ranges for normal, warm and fever conditions. Typically a user must consult a guide or chart to determine if the temperature read poses a threat to the patient.

Additionally, while an electronic thermometer is easier to read than a glass-tube thermometer, it can still be difficult to read for those with poor vision. Thus, conventional thermometers lack a cost-effective, easily identifiable indication of the measured temperature.

U.S. Pat. No. 5,829,878 to Weiss et al. ("Weiss") discloses a thermometer that lights a backlight only on the detection that the temperature reading is complete. If the temperature reading is not completed, the backlight will not be activated. Thus, if the patient accidentally interrupts the reading, the patient will not receive the benefit of the backlight to enable them to see the display. Also, in one embodiment, Weiss' thermometer shuts the backlight off after a predetermined time. If the patient leaves the thermometer in place after the reading longer than the predetermined time, the patient will not get the benefit of the backlight when the patient actually reads the displayed temperature.

In an alternate embodiment, Weiss discloses that the backlight does not shut off until the on/off switch is pressed. This can lead to a drain on the battery and lower the service life of both the battery and the thermometer. The thermometer can be left in the patient for a significant amount of time, if the caregiver is away from the patient attending to other matters. Weiss' thermometer will be backlit the entire time, draining the battery unnecessarily.

A number of U.S. patents disclose thermometers with audible alarms if a patient's temperature is high enough to indicate a fever or once the reading is completed. For example, U.S. Pat. No. 5,165,798 to Watanabe describes an electronic thermometer with an electronic buzzer that is used to indicate the completion of a temperature measurement. Watanabe does not disclose an indicator based on the specific temperature of the particular patient.

U.S. Pat. No. 5,923,258 to Tseng discloses an electronic thermometer designed to display a digital temperature signal under all temperature reading conditions. Tseng then produces a fever alarm indication by optionally flashing the temperature readout and/or sounding a buzzer. Thus, if the patient does not have a fever, the user must still read the display to determine the temperature of the patient. Tseng does not provide audio or visual signals for any other temperature range.

Visual signals identifying the relative temperature of an engine's cooling water are also known. U.S. Pat. No. 6,778,095 to Lo discloses pointer-type meters for vehicles and linking a gradated color scale to the reading determined by the meter. As an initial point, Lo does not relate to thermometry for living beings. Further, Lo does not sense the temperature of the water directly, but senses the displacement of the pointer needle and lights the appropriately colored light. Lo must sense the physical displacement of the pointer to allow the system to be interchangeable with any pointer-type meter. Thus, Lo requires a pointer-type meter and triggers the illumination indirectly by reading the physical displacement of the pointer and not the actual temperature.

U.S. Pat. No. 6,441,726 to Voto et al. ("Voto") also discloses a warning system for a vehicle instrument cluster wherein the gages can be backlit or have a gradated color scale. The colored lights can be steady on/off or can flash. As with Lo, Voto does not relate to thermometry for living beings. Additionally, Voto does not replace the standard display, but illuminates the standard gauges in a vehicle instrument cluster. Thus, the user may be confronted with a confusing display of both analogue and colored visual stimuli.

Further, using either Lo's or Voto's inventions in a thermometer for living beings is both size and cost prohibitive, since both a readout display and a colored scale display must be included. When included in the cost of a vehicle, the additional cost for the visual system is nominal. However, for a thermometer designed for living beings, it can be a substantial proportion of the cost to include both displays.

Thus, there is a need in the art for a low cost, easy to read, colored visual display for a thermometer meant for living beings.

Further, there is a need in the art for a low cost, easy to read, colored visual display for a thermometer meant for living beings that activates the backlight once the thermometer is removed from the patient.

SUMMARY OF INVENTION

An electronic thermometer has a temperature sensing element connected to a powered processor and a display. The components are housed in a case having a probe section and a body section. A typical case can be a rigid plastic or any other material.

The processor and display are secured in the body section of the case and the body section can include a power/initialization button. The temperature sensing element is mounted at the end of the probe section and is covered with a conductive cap.

The processor can receive signals from the temperature sensing element related to the temperature of the living being, i.e., the patient, and can convert the signals to a temperature in either Fahrenheit or Centigrade. The processor can also include a memory for storing ranges of temperatures and an adjustment for the display. The processor can compare the currently read temperature to the stored temperatures and adjustment values to determine which element of the display to illuminate.

The display can include a transparent or "see-through" liquid crystal display (LCD) to display the actual temperature. The body section is formed with an opening, hole, or recess and the LCD is placed inside. The user can see through the LCD and thus through the case. One or more lighting elements, which in an embodiment, can be light emitting diodes (LEDs) or similar light emitting elements, are disposed in the display and peripheral to the LCD. The light emitting element can backlight the display to illuminate the LCD or be the sole temperature display.

In one embodiment, the light emitting element is capable of generating different colored light to backlight the display. For example, the light emitting element can generate a first, second, third, and fourth color.

In another embodiment, the display can include a translucent liquid crystal display (LCD). The LCD can be any shape, including rectangular and octagonal and can be a "reverse" LCD. A reverse LCD lights the numerals of the display instead of the background. This increases the visibility and viewing angle of the LCD.

The display can further include a transparent lens. In an embodiment, the lens can be circular, elliptical, or any other shape to form the display. One or more lighting elements are disposed in the display and peripheral to the LCD. The light emitting element edge lights the display to illuminate the LCD.

The light emitting element is capable of generating different colored light to edge light the display. For example, the light emitting element can generate a first, second, and third color. The first color, which in an embodiment is green, can correspond to a range of temperatures indicating a "normal" temperature of the patient. The second color can be yellow and can indicate that the patient is "warmer" than normal and the third color, which can be red, and indicates a fever. Additionally, more than one light emitting element can correspond to the chosen temperature range or multiple light emitting elements can be illuminated at one time.

The display includes multiple lighting elements, which can be light emitting diodes (LEDs) or similar light emitting elements. A first light emitting element can be a first color. A second light emitting element can be a second color, a third light emitting element can be a third color and a fourth light emitting element can be a fourth color, etc.

In an embodiment, the first color can be white and illuminated once the power/initialization button is pressed and can indicate that the thermometer is ready to read a temperature. The second light emitting element can illuminate the second color, green. The temperature corresponding to the second color can be temperatures ranging between 97-98.9° F. Thus, the second color can indicate a "normal" temperature of the patient. The third color emitted by the third light emitting element can be yellow to indicate that the patient is "warmer" than normal. A typical patient temperature range for "warm" is 99.0-100.9° F. The fourth light emitting element has the fourth color of red that indicates a fever when the temperature of the patient is greater than 101.0° F.

In use, the user presses the power/initialization button and waits for the first light emitting element to light indicating that thermometer is ready to read a temperature. The user then places the probe section in contact with the patient to sense the temperature thereof. As the processor receives the temperature signal, it accesses memory to determine which range the read temperature falls into. The processor then intermittently lights the second light emitting element as the temperature is being read. The flashing second light emitting element indicates that the reading is not complete. Once the reading is complete, the second light emitting element can be illuminated steadily, indicating to the user that the reading is complete and that the temperature of the patent falls within the "green" range.

If the temperature of the patient increases during the reading, the third and fourth light emitting elements can also be intermittently lit. The third light emitting element can flash and steadily illuminate the third color while the reading is within the range calibrated for the third color. Further, if the temperature of the patient dictates, the fourth light emitting element can flash and then turn steady to indicate that the reading is complete and the patient has a fever. Thus, as the reading is being taken, the light emitting elements transition from the first to the fourth color while flashing and then steadily illuminate the light emitting element corresponding to the actual temperature of the patient. Additionally, more than one light emitting element can correspond to the chosen temperature range or multiple light emitting elements can be illuminated at one time.

A method to activate the backlight emitting element has the steps of the thermometer beginning the temperature reading cycle and the processor taking the readings from the temperature sensing element. The processor can look for a temperature increase and if a temperature increase is detected, it applies an algorithm to determine the temperature of the patient, such as a "peak and hold" and a "predictive" algorithm, to the readings. If the processor detects a temperature decrease, it determines if the decrease is greater than or equal to a preprogrammed threshold. If the temperature drop is greater than or equal to the preprogrammed threshold, the processor activates the backlight emitting element. The reason for activating the light emitting element when a temperature drop equals or exceeds the predetermined threshold, is that this is an indicator that the thermometer has been removed from the patient. When the thermometer is removed from the patient, the thermometer typically undergoes a temperature drop since it is going from the relatively warm body environment to the relatively cooler air outside the body. If the temperature drop is not greater than or equal to the threshold, the processor continues to take readings to determine if the temperature is increasing or decreasing.

Alternatively, once the algorithm is complete, the processor looks for a decrease in temperature and if the temperature drop is greater than or equal to a preprogrammed threshold, the processor activates the backlight emitting element. If the temperature drop is not greater than the threshold, the processor continues to take readings to determine if the temperature is decreasing.

The preprogrammed threshold can be based on temperature, time, or number of readings. The temperature threshold can be if the temperature drops between about 0.1 to about 5° (either Fahrenheit or Centigrade). In one embodiment, the threshold temperature amount is about 0.1°. Alternately, the threshold can be determined based on the amount of time it takes to achieve a significant drop in temperature without having the patient wait too long for the backlight to activate. This time can vary between about 1 to about 6 seconds.

Further, the threshold can be the number of readings in which the temperature drops. The number of readings can vary between 1 and about 10,000, depending on the sampling rate of the thermometer and the length of time the thermometer is sampling. Thus, if the processor reads one or more temperatures where the current reading decreases from the previous reading, the backlight is triggered.

Another method includes a thermometer lighting the first color to indicate that the thermometer is ready to read a temperature from the temperature sensing element. In one embodiment, the first color can remain illuminated throughout the entire read cycle or shut off after a specific amount of time or once the temperature reading is begun.

The temperature reading cycle begins and the processor can take the readings from the temperature sensing element. The processor applies an algorithm and looks for a temperature change. If the temperature is increasing or steady, the processor determines if the temperature reading has ended and may continue to apply the algorithm. If the processor detects a temperature decrease, it determines if the decrease is greater than or equal to a preprogrammed threshold. If the temperature drop is greater than or equal to the preprogrammed threshold, the processor activates the first color. If the temperature drop is not greater than or equal to the threshold, the processor continues to take readings to determine if the temperature is increasing or decreasing.

Once the algorithm has ended, the processor determines the sensed temperature and then looks for a decrease in temperature. If the temperature drop is greater than or equal to the preprogrammed threshold, the processor compares the sensed temperature to a first range and if the sensed temperature falls within the first range, the second color is illuminated. If the sensed temperature does not fall within the first range, the processor determines if it falls within a second range, and if so, illuminates the third color. If the sensed temperature does not fall within the second range, the processor determines if it falls within a third range, and if so, illuminates the fourth color. If the sensed temperature does not fall within the three ranges, the first color can be illuminated.

For example, when a patient activates the thermometer, a white light emitting element can be activated. The processor starts a temperature read and can optionally turn off the white light emitting element. If the patient removes the thermometer in the middle of the temperature read, the processor detects the decrease in temperature and activates the white light emitting element. If the patient leaves the thermometer in place until the temperature reading is complete, the processor then waits to detect a temperature decrease. Once the patient removes the thermometer from the temperature sensing position, the temperature of the temperature sensing element drops and is detected by the processor. The processor detects the drop and determines if the drop is larger than a preprogrammed threshold. If the drop is large enough, the processor determines if the sensed temperature falls within the above-discussed predetermined ranges. The processor then illuminates either the green, yellow, or red light emitting element depending on which range the sensed temperature falls into.

Embodiments include a thermometer for use with a living being having a temperature sensing tip, a processor taking temperature readings and determining a sensed temperature reading of the living being from the temperature sensing tip. The thermometer also includes a display and a backlight for lighting the display. The backlight is activated upon a command from the processor and the processor determines whether a decrease in the temperature readings exceeds a predetermined temperature amount in order to activate the backlight.

A method embodiment includes the steps of using a processor to monitor a temperature change indicated by a temperature sensing element. The processor then detects a temperature decrease and activates a first color light emitting element to backlight a display if the temperature decrease exceeds a predetermined amount.

Embodiments can include changing the color scheme to be any range of colors. Alternately, all of the light emitting elements can be one element capable of emitting a range of colors. The light emitting elements can be differing shades of the same base color. For example, the second color can be a darker green than first color. The same shading scheme can be used for third and fourth light emitting elements.

Further, multiple light emitting elements can be illuminated to form the necessary colors. An embodiment can utilize a color scale of blue, green and yellow, where blue and yellow light emitting elements illuminate to form the green color in the display. Further, intensities of certain base colors can be used to form any and every color. For example, combinations of red, blue and green can form many colors of the spectrum and these base colors can be used solely to be combined to form the first through fourth colors of the above embodiments. The base colors themselves may not be a color in the selected range.

BRIEF DESCRIPTION OF THE DRAWING FIGURES

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 4 is a flow diagram illustrating a method of illuminating multiple colored backlights of the present invention;

DETAILED DESCRIPTION OF THE INVENTION

Figure 1:
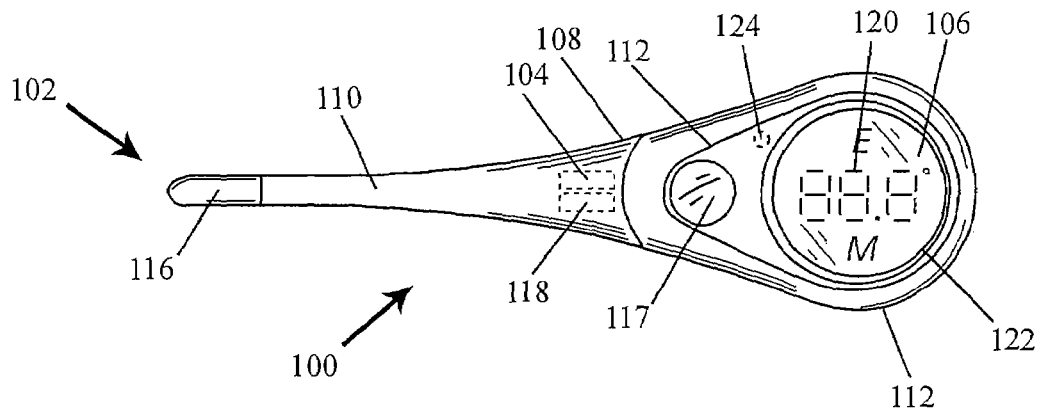
FIG. 1 is a top view of a color display thermometer of the present invention.

Referring to FIG. 1, an embodiment of an electronic thermometer 100 for use with a living being is illustrated. A temperature sensing element 102 is connected to a powered processor 104 and/or a display 106. The components are housed in a case 108 having a probe section 110 and a body section 112.

The processor 104 and display 106, and in one embodiment a battery (not illustrated), are secured in the body section 112 of rigid case 108 along with an access door (not illustrated), optionally provided for battery replacement. Further, body section 112 can include a power/initialization button 117. The temperature sensing element 102 is mounted at the end of probe section 110 and covered with a conductive cap 116. The conductive cap 116 can be, for example, metal.

The processor 104 can receive signals from temperature sensing element 102 related to the temperature of the living being, i.e., the patient. The processor 104 can convert the signals to a temperature in either Fahrenheit or Centigrade. The processor 104 can also include a memory 118 for storing ranges of temperatures and an adjustment for the display 106. Processor 104 can compare the currently read temperature to the stored temperatures and adjustment values to determine what color to illuminate the display 106.

The display 106 can include a transparent or "see-through" liquid crystal display (LCD) 120 for displaying the actual temperature, and in an embodiment, to a tenth of a degree. The body section 112 is formed with an opening or recess 122 and the LCD 120 is placed inside. The user can see through LCD 120 and thus through case 108. One or more lighting elements 124, which in an embodiment, can be light emitting diodes (LEDs) or similar light emitting elements, are disposed in the display 106 and peripheral to LCD 120. The backlight emitting element 124 backlights the display 106 to illuminate the LCD 120. LEDs 124 can also be the used without the display 106 and be used as the sole display of a sensed temperature Ts.

In one embodiment, the light emitting element 124 is capable of generating different colored light to backlight the display 106. For example, the light emitting element 122 can generate a first, second, third, and fourth color. The first color can be white and is illuminated once the power/initialization button 117 is pressed. The power initialization button 117 activates the thermometer 100 or resets it for another reading. The first color of the light emitting element 124 can indicate that the thermometer 100 is ready to read a temperature. The second color, which in an embodiment is green, can correspond to temperatures ranging between 97-98.9° F. Thus, the second color can indicate a "normal" temperature of the patient.

The third color emitted by the light emitting element 124 can be yellow and can indicate that the patient is "warmer" than normal. A typical "warm" temperature range is 99.0-100.9° F. The fourth color, which can be red, indicates a fever where the temperature of the patient is greater than 101.0° F.

Alternately, the first through fourth colors can be generated by individual light emitting elements, each generating a separate color, or by combining colors to generate the first through fourth color.

Further, the thermometer 100 can use various routines or algorithms to determine the temperature of the patient, such as a "peak and hold" and a "predictive" algorithm, both of which are described below. The activation of the backlight emitting element 124 of the display 106 can be separate from or linked to the temperature determining routine. Typical routines take constant or intermittent readings from the temperature sensing element 102, apply an algorithm to these readings, and send a display of a sensed temperature Ts once the algorithm has determined that a temperature of the patient has been determined.

Figure 2:
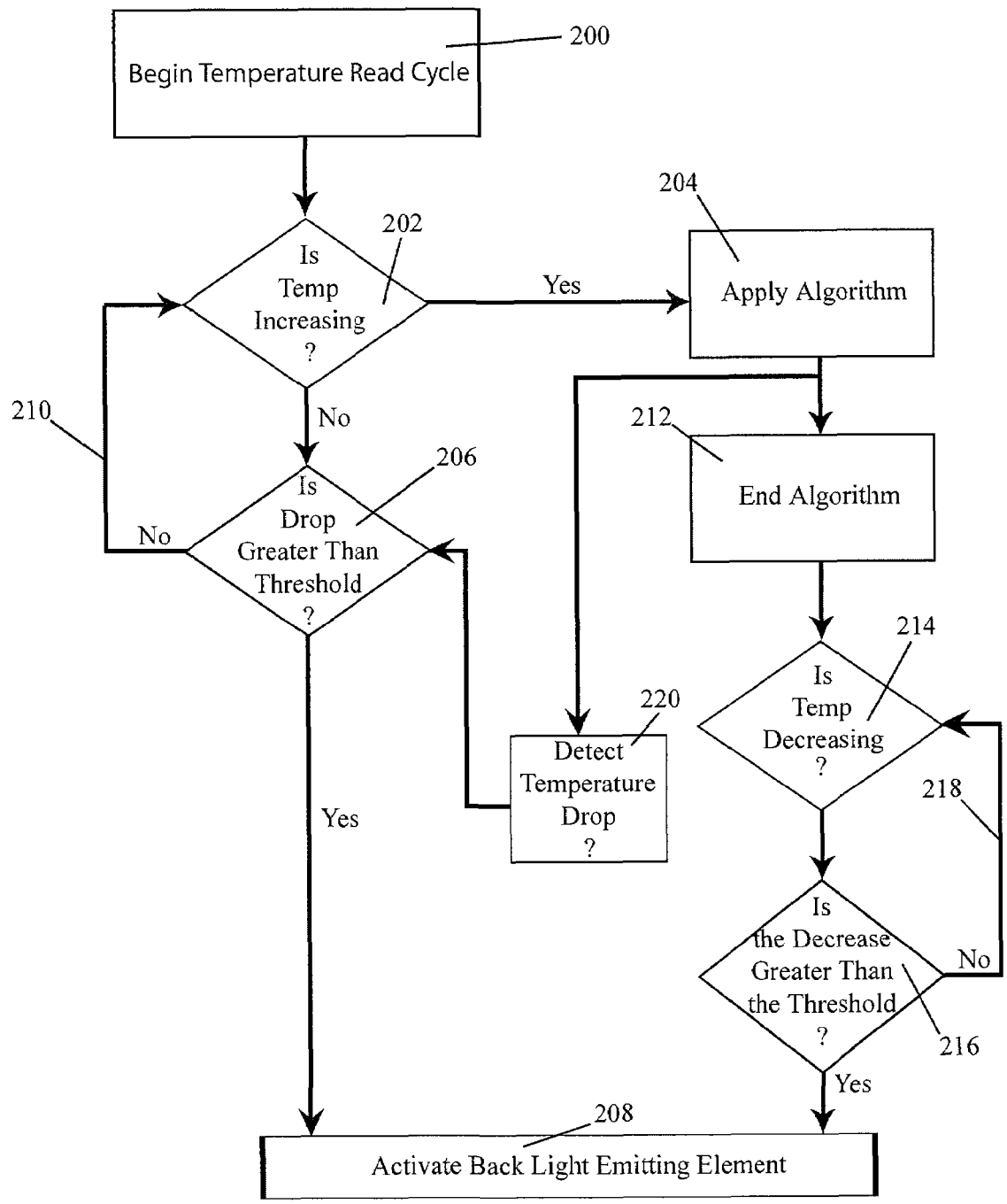
FIG. 2 is a flow diagram illustrating a method to illuminate a backlight of the present invention.

FIG. 2 illustrates a method to activate the backlight emitting element 124. The thermometer 100 can begin the temperature reading cycle (step 200) and the processor 104 can take the readings from the temperature sensing element 102. The processor can look for a temperature increase (step 202) and if a temperature increase is detected, it applies the algorithm to the readings (step 204). If the processor 104 detects a temperature decrease, it determines if the decrease is greater than or equal to a preprogrammed threshold (step 206). If the temperature drop is greater than or equal to the preprogrammed threshold, the processor 104 activates the backlight emitting element 124 (step 208). The reason for activating the light emitting element 124 when a temperature drop meets or exceeds the predetermined threshold, is that this is an indicator that the thermometer has been removed from the patient. When the thermometer is removed from the patient, the thermometer typically undergoes a temperature drop since it is going from the relatively warm body environment to the relatively cooler air outside the body. If the temperature drop is not greater than or equal to the threshold, the processor 104 continues to take readings (step 210) to determine if the temperature is increasing or decreasing.

Alternatively, once the algorithm is complete (step 212), the processor looks for a decrease in temperature (step 214) and if the temperature drop is greater than or equal to the preprogrammed threshold (step 216), the processor 104 activates the backlight emitting element 124 (step 208). If the temperature drop is not greater than or equal to the threshold, the processor 104 continues to take readings (step 218) to determine if the temperature is decreasing.

Additionally, the patient may remove the thermometer in the middle of a temperature read. If this occurs, the processor 104 detects that the temperature which was increasing is suddenly decreasing (step 220) and can interrupt the algorithm to make the threshold determination (step 206) and activate the backlight emitting element 124 (step 208). In a further embodiment, the processor 104 waits a predetermined amount of time after the readings have dropped (for example, 6, 16, or 32 seconds) before beginning to check for the threshold in order to turn on the backlight emitting element 124.

In one embodiment, the temperature sampling routine can implement a "peak and hold" algorithm based on the temperatures indicated by the temperature sensing element 102. The temperature measured by the temperature sensing element 102 must remain stable within a fixed temperature range over a time period. For example, the temperature reading must stay within 0.1° F. for a minimum of 10 seconds. It is to be appreciated by those skilled in the art that other stability windows could also be used to determine that the measurement is stable.

Another temperature sampling routine can be a "predictive" algorithm. This algorithm looks not only at the temperature increase, but at how fast the temperature is increasing. Using change in time and temperature (e.g., the slope of a time vs. temperature curve), the processor 104 can determine what the final temperature should be and display that temperature instead of waiting for the readings to actually reach the final temperature. The backlight activation method of the present invention can be incorporated into either algorithm.

The preprogrammed threshold can be based on temperature, time, or number of readings. The temperature threshold can be if the temperature drops between about 0.1 to about 5° (either Fahrenheit or Centigrade). In one embodiment, the threshold temperature amount is about 0.1°. Alternately, the threshold can be determined based on the amount of time it takes to achieve a significant drop in temperature without having the patient wait too long for the backlight to activate. This time can vary between about 1 to about 6 seconds.

Further, the threshold can be the number of readings in which the temperature drops. The number of readings can vary between 1 and about 10,000, depending on the sampling rate of the thermometer and the length of time the thermometer is sampling. Thus, if the processor reads one or more temperatures where the current reading decreases from the previous reading, the backlight is triggered.

FIGS. 3A-3D illustrate another embodiment of the thermometer 300. A temperature sensing element 302 is connected to a powered processor 304 and/or a display 306. The components are housed in a case 308 having a probe section 310 and a body section 312. The body section 312 can include a power/initialization button 317 and the temperature sensing element 302 is mounted at the end of probe section 310.

The processor 304 can receive signals from temperature sensing element 302 related to the temperature of the patient. The processor 304 can convert the signals to a temperature in either Fahrenheit or Centigrade. The processor 304 can also include a memory 318 for storing ranges of temperatures and can compare the currently read temperature to the stored temperatures to determine which element of display 306 to illuminate. The memory 318 can also store one or more previously read temperatures. In an embodiment, memory activation button 332 can be depressed after a reading to store the reading and can be depressed afterwards to recall the stored reading and cycle through numerous other stored readings.

The display 306 can include a translucent liquid crystal display (LCD) 320. LCD 320 can be any shape, including rectangular and octagonal and can be a "reverse" LCD. A reverse LCD lights the numerals of the display instead of the background. This increases the visibility and viewing angle of the LCD 320.

The display 306 can further include a transparent or translucent lens 322. In an embodiment, the lens 322 can be circular, elliptical, or any other shape to form the display 306. One or more lighting elements 324, e.g., LEDs, are disposed in the display 306 and peripheral to LCD 320. The light emitting element 324 edge lights the display 306 to illuminate the LCD 320.

Figure 3A:
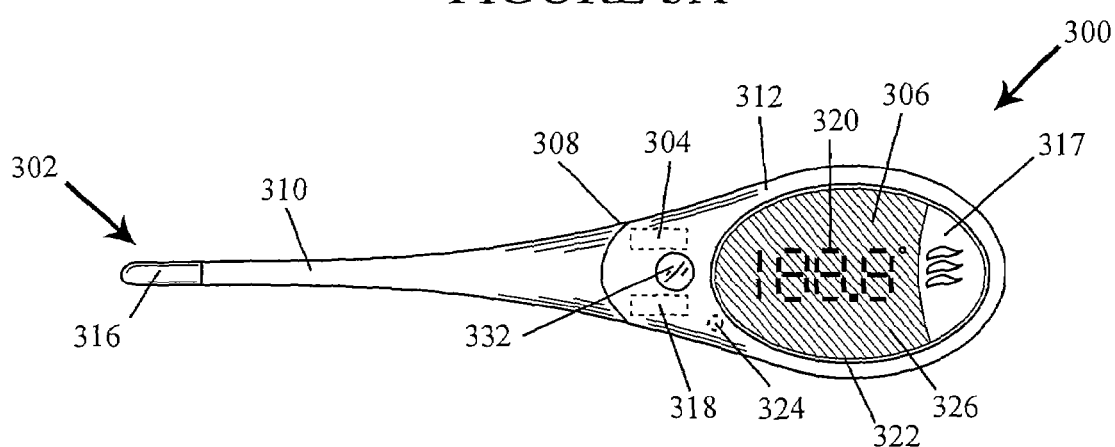
FIGS. 3A-3D are top views of an embodiment of a color display thermometer of the present invention in different stages of illumination.
Figure 3B:
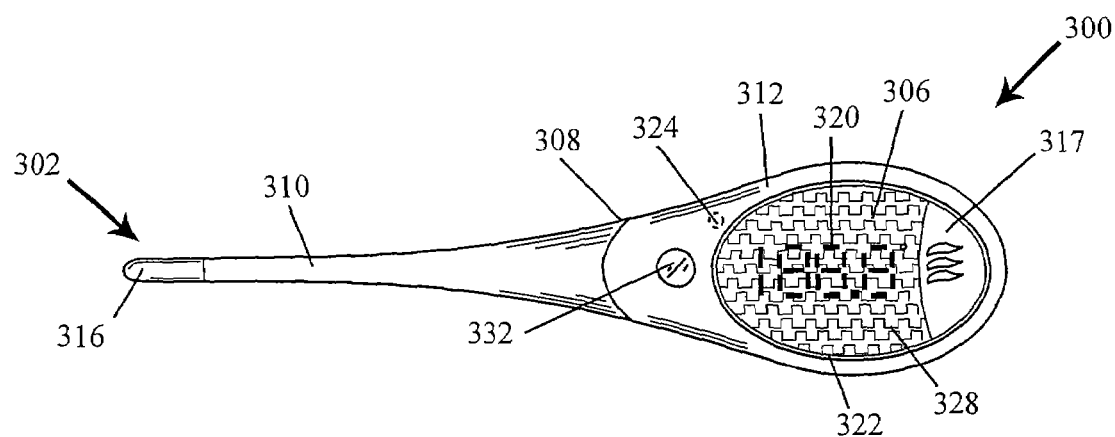
Figure 3C:
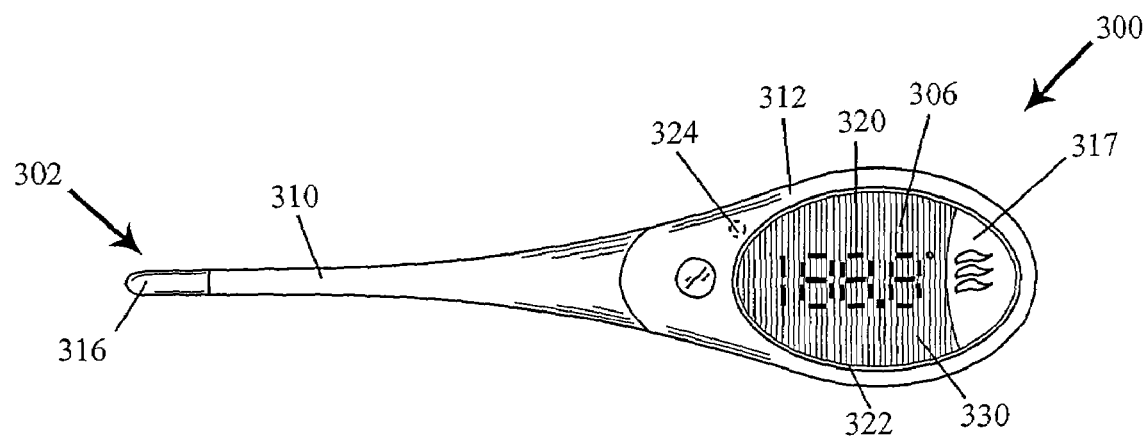
Figure 3D:
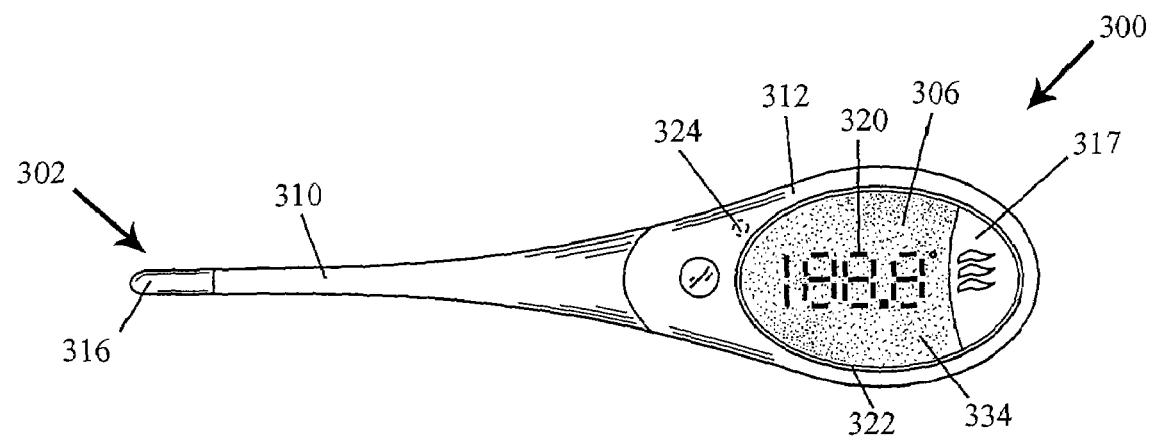

In one embodiment, using only FIGS. 3A-3C the light emitting element 324 is capable of generating different colored light to edge light the display 306. For example, the light emitting element 324 can generate a first, second, and third color. The first color 326, illustrated in FIG. 3A, which in an embodiment is green, can correspond to a range of temperatures indicating a "normal" temperature of the patient. The second color 328 emitted by the light emitting element 324 can be yellow and can indicate that the patient is "warmer" than normal, as illustrated in FIG. 3B. FIG. 3C illustrates the third color 330, which can be red, and indicates a fever. The temperature range corresponding to each of the first, second and third colors, respectively can be dictated by the preferred location to read the temperature of the patient and the age of the patient. Different age groups of patients as well as whether the temperature is taken orally, rectally, or axillary can dictate different ranges of temperatures considered normal, warm and fever. Additionally, more than one light emitting element can correspond to the chosen temperature range or multiple light emitting elements can be illuminated at one time. Each color can be a separate light emitting element, one element can emit all of the colors, or combinations of light emitting elements can form one or more colors.

In another embodiment, using FIGS. 3A-3D, the light emitting elements 324 are capable of generating a first, second, third, and fourth color. The first color 326 can be white and is illuminated once the power/initialization button 317 is pressed. The power initialization button 317 activates the thermometer 300 or resets it for another reading. The first color 326 of the light emitting elements 324 can indicate that the thermometer 300 is ready to read a temperature. Further, the first color 326, which in an embodiment, can be white, can indicate an incomplete reading was taken from the fact that the sensed temperature Ts is less than 97° F. The second color 328, which in an embodiment is green, can correspond to temperatures ranging between 97-98.9° F. Thus, the second color can indicate a "normal" temperature of the patient.

The third color 330 emitted by the light emitting elements 324 can be yellow and can indicate that the patient is "warmer" than normal. A typical "warm" temperature range is 99.0-100.9° F. The fourth color 334, which can be red, indicates a fever where the temperature of the patient is greater than 101.0° F.

Alternately, the first through fourth colors 326, 328, 330, 334 can be generated by individual light emitting elements, each generating a separate color, or by combining colors to generate the first through fourth colors.

FIG. 4 illustrates the method of activating the backlight emitting elements for an exemplary four color scheme. Thermometer 300 can use various temperature sampling routines to determine the temperature of the patient, including the "peak and hold" and "predictive" routines described above. The activation of the light emitting elements 324 to illuminate the display 306 can be separate from or linked to the temperature sampling routine.

The method includes the thermometer 300 lighting the first color 326 to indicate that the thermometer 300 is ready to read a temperature from the temperature sensing element 302 (step 400). In one embodiment, the first color 326 can remain illuminated throughout the entire read cycle. However, certain thermometers do not have enough battery power to keep the light emitting elements 324 illuminated at the same time a reading is being taken. If battery power is an issue, the first color 326 light emitting element 324 can be shut off after a specific amount of time or once the temperature reading is begun. The temperature reading cycle begins (step 402) and the processor 304 can take the readings from the temperature sensing element 302. The processor 304 applies an algorithm (step 404) and looks for a temperature change (step 406). If the temperature is increasing or steady, the processor 304 determines if the temperature reading has ended (step 408) and may continue to apply the algorithm (step 410). If the processor 304 detects a temperature decrease, it determines if the decrease is greater than a preprogrammed threshold (step 412). If the temperature drop is greater than to equal to the preprogrammed threshold, the processor 304 activates the first color 326 (step 414). If the temperature drop is not greater than or equal to the threshold, the processor 304 continues to take readings (step 416) to determine if the temperature is increasing or decreasing.

Once the algorithm has ended, the processor 304 determines the sensed temperature Ts (step 418). Then the processor 304 looks for a decrease in temperature (step 420) and if the temperature drop is greater than or equal to a preprogrammed threshold (step 422). The processor 304 compares the sensed temperature Ts to a first range (step 424) and if the sensed temperature falls within the first range, the second color 328 is illuminated (step 426). If the sensed temperature Ts does not fall within the first range, the processor 304 determines if it falls within a second range (step 428), and if so, illuminates the third color 330 (step 430). If the sensed temperature Ts does not fall within the second range, the processor 304 determines if it falls within a third range (step 432), and if so, illuminates the fourth color 334 (step 434). If the sensed temperature Ts does not fall within the three ranges, the first color can be illuminated (step 436).

For example, when a patient activates the thermometer, a white light emitting element can be activated. The processor starts a temperature read and can optionally turn off the white light emitting element. If the patient removes the thermometer in the middle of the temperature read, the processor detects the decrease in temperature and activates the white light emitting element. If the patient leaves the thermometer in place until the temperature reading is complete, the processor then waits to detect a temperature decrease. Once the patient removes the thermometer from the temperature sensing position, the temperature of the temperature sensing element drops, which is detected by the processor. The processor detects the drop and determines if the drop is larger than or equal to the preprogrammed threshold. If the drop matches the threshold, the processor determines if the sensed temperature falls within the above-discussed predetermined ranges. The processor then illuminates either the green, yellow, or red light emitting element depending on which range the sensed temperature falls into.

In a further embodiment, the processor waits a predetermined amount of time after the readings have dropped (for example, 6, 16, or 32 seconds) before beginning to check for the threshold temperature drop.

The preprogrammed threshold can be based on temperature, time, or number of readings. The temperature threshold can be if the temperature drops between about 0.1 to about 5° (either Fahrenheit or Centigrade). In one embodiment, the threshold temperature amount is about 0.1°. Alternately, the threshold can be determined based on the amount of time it takes to achieve a significant drop in temperature without having the patient wait too long for the backlight to activate. This time can vary between about 1 to about 6 seconds.

Further, the threshold can be the number of readings in which the temperature drops. The number of readings can vary between 1 and about 10,000 depending on the sampling rate of the thermometer and the length of time the thermometer is sampling. Thus, if the processor reads one or more temperatures where the current reading decreases from the previous reading, the light emitting element is triggered.

Figure 11:
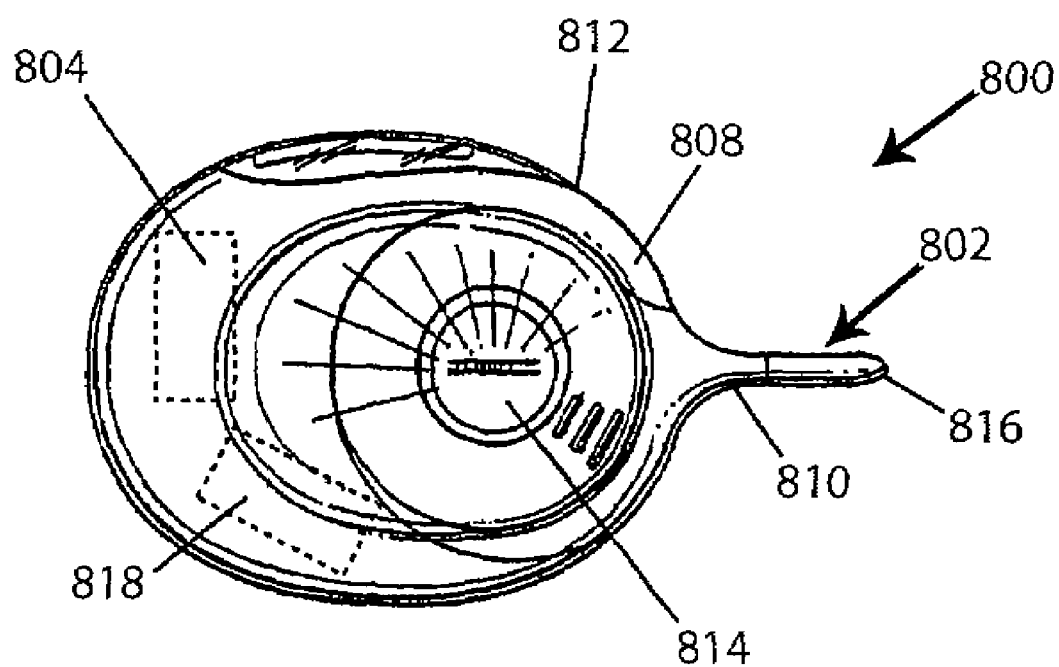
FIG. 11 is a right side view of a further embodiment of a color display thermometer of the present invention.
Figure 12:
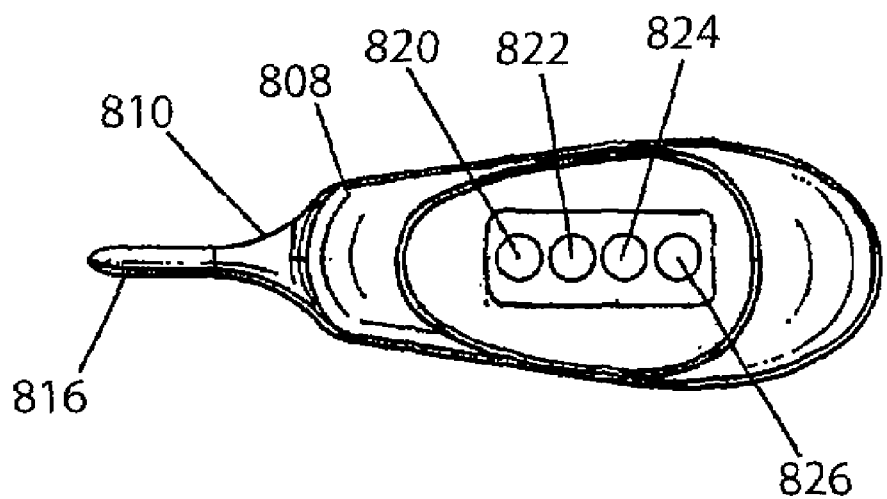
FIG. 12 is top view of the embodiment illustrated in FIG. 11.

Referring to FIGS. 11 and 12, an embodiment of an electronic thermometer 800 for use with a living being is illustrated. A temperature sensing element 802 is connected to a powered processor 804 and/or a display 806. The components are housed in a rigid plastic case 808 having a probe section 810 and a body section 812.

The processor 804 and display 806, and in one embodiment a battery (not illustrated), are secured in the body section 812 of rigid case 808 along with an access door 814, optionally provided for battery replacement. Further, body section 812 can include a power/initialization button (not illustrated). Temperature sensing element 802 is mounted at the end of probe section 810 and covered with a conductive cap 816.

Processor 804 can receive signals from temperature sensing element 802 related to the temperature of the living being, i.e., the patient. Processor 804 can convert the signals to a temperature in either Fahrenheit or Centigrade. The processor 804 can also include a memory 818 for storing ranges of temperatures and corresponding colors for the display 806. Processor 804 can compare the currently read temperature to the stored temperatures and corresponding colors to determine which element of display 806 to illuminate.

Display 806 includes multiple lighting elements, which in an embodiment, can be light emitting diodes (LEDs) or similar light emitting elements. In one embodiment, illustrated in FIGS. 11 and 12, the first light emitting element 820, is a first color. A second light emitting element 822 is a second color, a third light emitting element 824 is a third color and a fourth light emitting element 826 is a fourth color.

In one embodiment, the first color of the first light emitting element 820 can be white and is illuminated once the power/initialization button is pressed. The power initialization button activates the thermometer 800 or resets it for another reading. Light emitting element 820 can indicate that the thermometer 800 is ready to read a temperature. Second light emitting element 822 can illuminate a second color, which in an embodiment is green. The temperature corresponding to the second color can be temperatures ranging between 97-98.9° F. Thus, the second color can indicate a "normal" temperature of the patient.

The third color emitted by the third light emitting element 824 can be yellow and can indicate that the patient is "warmer" than normal. A typical range is 99.0-100.9°F. The fourth light emitting element 826 can have the fourth color of red indicating a fever where the temperature of the patient is greater than 101.0° F.

In use with a rectal thermometer embodiment, the user presses the power/initialization button and waits for the first light emitting element 820 to light indicating that thermometer 800 is ready to read a temperature. The user places probe section 802 and the tip 816 in contact with the patient's rectal region, and within the anal canal, to sense the temperature thereof. As the processor 804 receives the temperature signal, it accesses memory 818 to determine the range in which the read temperature falls. Processor 804 then intermittently lights second light emitting element 822 as the temperature is being read. The flashing second light emitting element 822 indicates that the reading is not complete. Once the reading is complete, second light emitting element 822 can be illuminated steadily, indicating to the user that the reading is complete and that the temperature of the patent falls within the "green" range.

If the temperature of the patient increases during the reading, the third or fourth light emitting elements 824, 826 can also be intermittently lit. Thus, the third light emitting element 824 can flash and steadily illuminate the third color while the reading is within the range calibrated for the third color. Further, if the temperature of the patient dictates, the fourth light emitting element 826 can flash and then turn steady to indicate that the reading is complete and the patient has a fever. Thus, as the reading is being taken, the light emitting elements transition from the first to the fourth color while flashing and then steadily illuminate the light emitting element corresponding to the actual temperature of the patient.

In alternate embodiments, the processor 802 starts by lighting the first light emitting element 820 in one of a steady or intermediate fashion and just lights a designated light emitting element 822, 824, 826 as dictated by the final temperature of the patient. The light emitting element is illuminated in a steady state to only indicate the final actual temperature of the patient.

Figure 5:
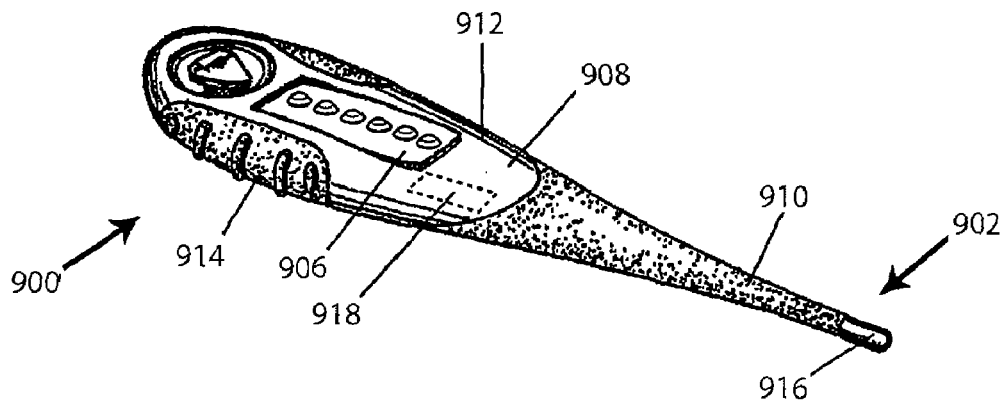
FIG. 5 is a perspective view of another embodiment of the color display thermometer of the present invention.
Figure 6:
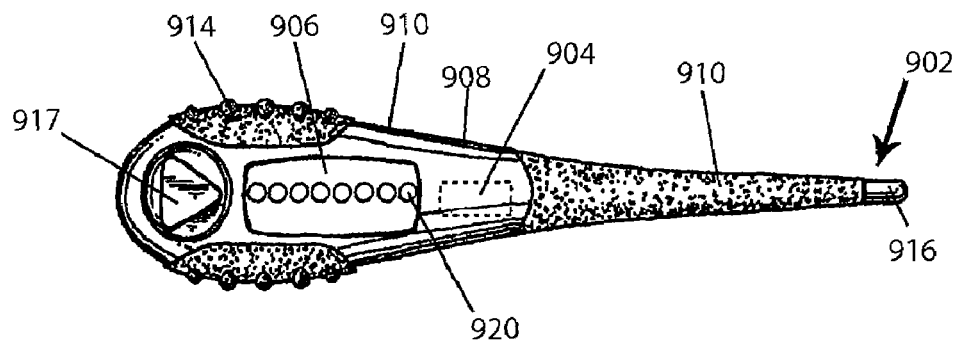
FIG. 6 is a top view of the embodiment of FIG. 5.
Figure 7:
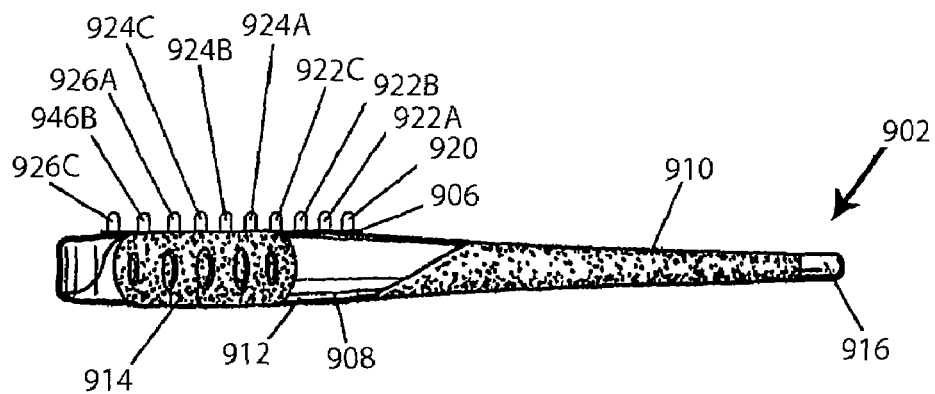
FIG. 7 is a right side view of the present invention as illustrated in FIG. 5.

Referring to FIGS. 5-7, another embodiment of an electronic thermometer 900 for use with a living being is illustrated. A temperature sensing element 902 is connected to a powered processor 904 and display 906. The components are housed in a case 908 (typically rigid plastic) having a probe section 910 and a handle section 912. Handle section 912 can include a grip 914.

Temperature sensing element 902 is mounted at the end of probe section 910 and covered with a conductive cap 916 (typically metal, e.g. nickel or stainless steel). The processor 904 and display 906, and in one embodiment a battery (not illustrated), are secured in the handle section 912 of rigid case 908 along with an access door, optionally provided for battery replacement (not illustrated). Further, handle section 912 can include a power/initialization button 917.

Processor 904 can receive signals from temperature sensing element 902 related to the temperature of the patient. Processor 904 can convert the signals to a temperature in either Fahrenheit or Centigrade. The processor 904 can also include a memory 918 storing ranges of temperatures and corresponding colors for display 906. Processor 902 can compare the currently read temperature to the stored temperatures to determine which element of display 906 to illuminate.

Display 906 includes multiple lighting elements, which in an embodiment, can be light emitting diodes (LEDs) or similar light emitting elements. In one embodiment, illustrated in FIGS. 5-7, the first light emitting element 920, is a first color. Second light emitting elements 922A-922C are a second color, third light emitting elements 924A-924C are a third color and fourth light emitting elements 926A-926C are a fourth color.

In an embodiment, the first color of the first light emitting element 920 can be white and is illuminated once the power/initialization button 917 is pressed. Light emitting element 290 can indicate that the thermometer 900 is ready to read a temperature. Second light emitting elements 922A-922C can illuminate a second color, green. The temperature corresponding to the second color can be temperatures ranging between 97-98.9° F. The temperature range can be divided evenly across the second light emitting elements 922A-922C wherein second light emitting element 922A corresponds to a range of 97-97.6° F., second light emitting element 922B corresponds to a range of 97.7-98.3° F., and second light emitting element 922C corresponds to a range of 98.4-98.9° F. A second color can indicate a "normal" temperature of the patient. The third color can be yellow and can indicate that the patient is "warmer" than normal. A typical range for the third color is 99.0-100.3° F. and can again be divided between the third light emitting elements 924A-924C. Fourth light emitting elements 926A-926C can have the fourth color of red. This can indicate a fever and a range of 100.4 to greater than 101.0° F.

In use with an oral thermometer embodiment, the user presses power/initialization button 917 and waits for the first light emitting element 920 to light. In an embodiment, once the white light is lit, the thermometer 900 is ready to read a temperature. The user places the probe section 910 in the patient's mouth and disposes the tip 916 with temperature sensing element 902 under the patient's tongue to begin reading the patient's temperature. As the processor 904 receives the temperature signal it accesses memory 918 to determine the temperature ranges, compares the read temperature against the ranges, and determines which light emitting element to illuminate. Processor 904 then can incrementally light second light emitting elements 922A-922C as the temperature increases. If the temperature of the patient increases, the third and fourth light emitting elements 924A-924C and 926A-926C may also be incrementally lit. Processor 904 determines that the final temperature of the patient is reached and the light emitting element corresponding to the final temperature range cane illuminated steadily or blinks to indicate that the reading is complete.

Embodiments include changing the color scheme to be any range of colors. Alternately, all of the first through fourth light emitting elements can be one element capable of emitting a range of colors. The light emitting elements of the oral thermometer 900 embodiment can be differing shades of the same base color. For example, second light emitting element 922A can be a darker green than second light emitting element 922C. The same shading scheme can be used for third and fourth light emitting elements 924A-924C and 926A-926C. Further, multiple light emitting elements can be illuminated to form the necessary colors. An embodiment can utilize a color scale of blue, green and yellow, where blue and yellow light emitting elements illuminate to form the green color in the display. Further, intensities of certain base colors can be used to form any and every color. For example, combinations of red, blue and green can form many colors of the spectrum and these base colors can be used solely to be combined to form the first through fourth colors of the above embodiments. The base colors themselves may not be a color in the selected range.

Figure 8:
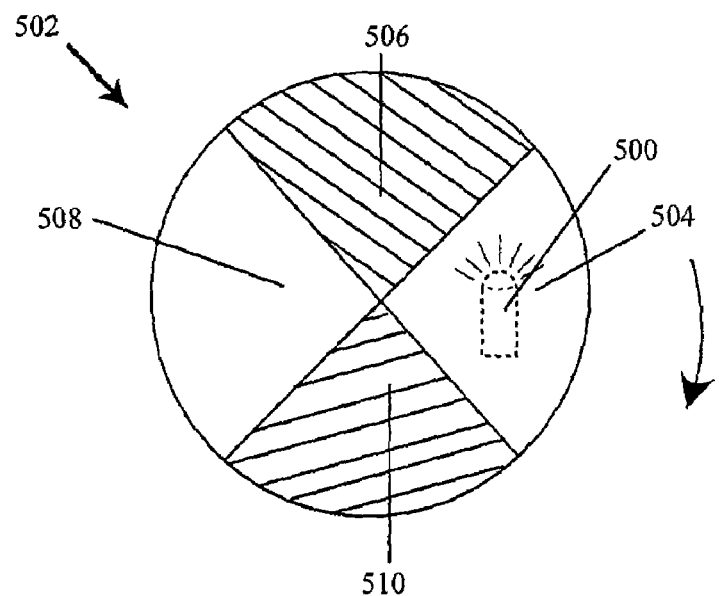
FIG. 8 is an embodiment of a display element of the present invention.

FIG. 8 illustrates an embodiment of the display 306/806/906. A single light emitting element 500 can be illuminated, either steadily or intermittently, and a colored filter 502 can be passed over the light emitting element 500 to display varying colors. For example, single light emitting element 500 can emit white light and colored filter 502 can have a clear portion 504, a first color portion 506 (e.g., green), a second color portion 508 (e.g., yellow) and a third color portion 510 (e.g., red).

Figure 9:
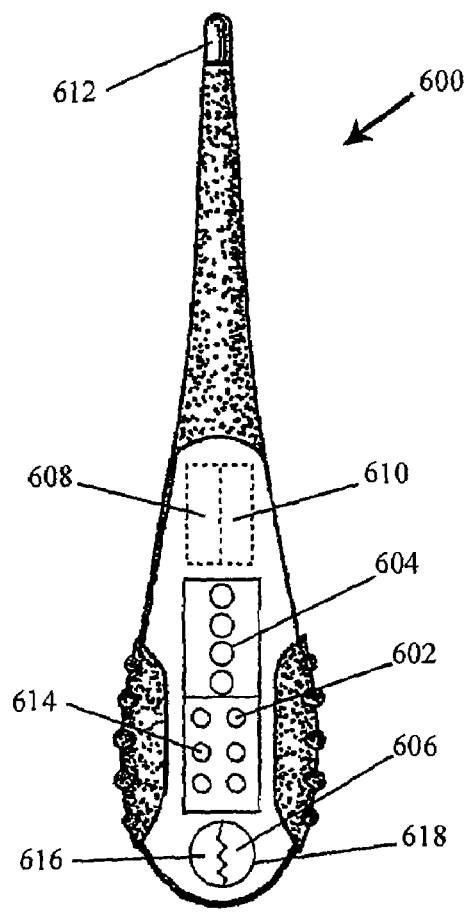
FIG. 9 is a top view of a further embodiment of the present invention.

FIG. 9 illustrates another embodiment of thermometer 600. Thermometer 600 can include many of the elements of the previous thermometers 100, 200, 300, 400 and can also include a patient adjustment scale 602 as part of or in addition to temperature display 604. Patient adjustment button 606 can be depressed to cycle between, for example, infant, child and adult temperature ranges. Thus, the ranges stored in memory 608 and accessed by processor 610 can vary by age of the patient. Thus, the user can change the set-points of the light emitting elements based on the age of the patient.

A further embodiment can change the set-points stored in memory 608 based on the placement of the temperature probe 612. A location display 614 can indicate where the user intends to place the thermometer to read the patient's temperature. Different temperature readings indicate a fever at different locations on the patient. For example, a temperature of 100.4° F. (38° C.) measured rectally corresponds to 99.5° F. (37.5° C.) measured orally which corresponds to a temperature of 99° F. (37.2° C.) measured in an axillary position. Location adjustment button 616 can be depressed to cycle through the available options for location.

Alternate embodiments include depressing only power/initialization button 918 to select all adjustment options and having just patient and location adjustment buttons 906, 916 as incremental switches without a corresponding display 902, 914. Additionally, all options, including temperature, patient, and location can be displayed using only one display to alternately display each set of options. Further, in an embodiment, only the display for the patient or location options can be an LCD display. Furthermore, the temperature ranges are exemplary only and can be changed to any given range.

Figure 10A:
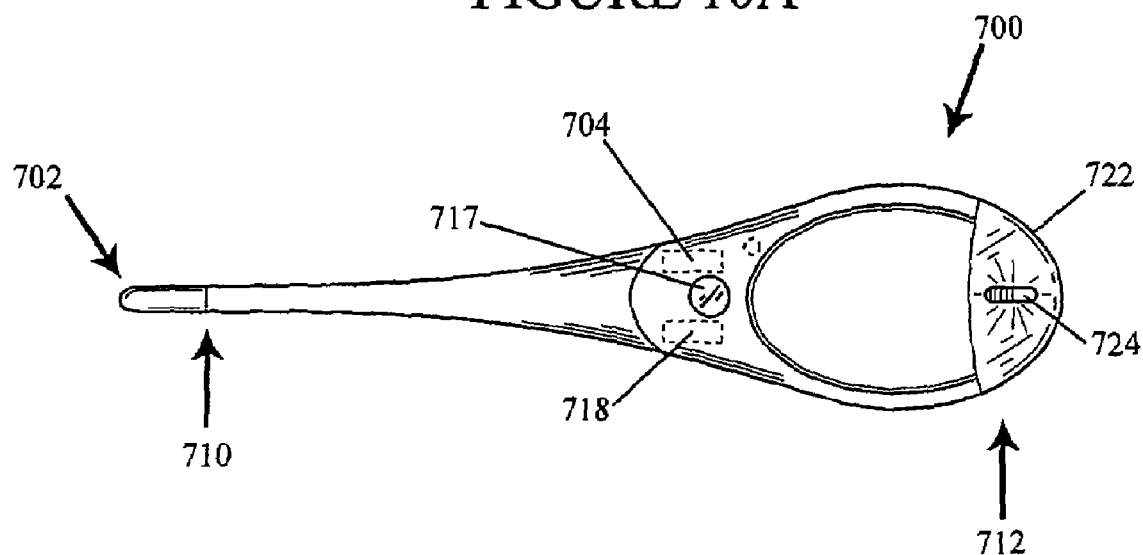
FIGS. 10a and 10b are perspective views of an additional embodiment of the present invention.
Figure 10B:
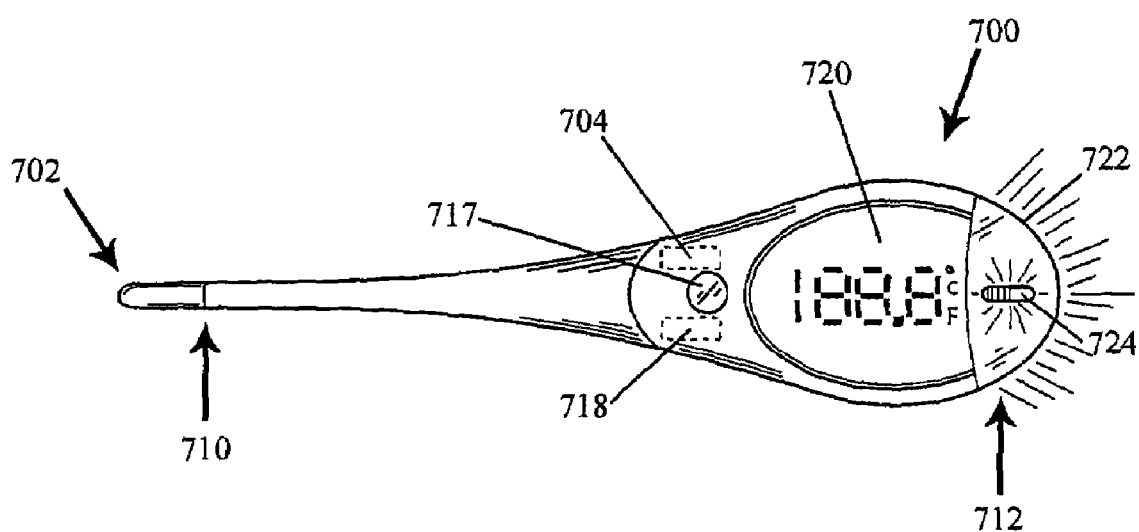

FIGS. 10a and 10b illustrate another embodiment of an electronic thermometer 700. A temperature sensing element 702 is connected to a powered processor 704 and/or a display 706. The components are housed in a plastic case 708 having a distal end 710 and a proximal end 712. The body section 712 can include a power/initialization button 717 and the temperature sensing element 702 is mounted at the distal end 710.

The processor 704 can receive signals from temperature sensing element 702 related to the temperature of the patient. The processor 704 can convert the signals to a temperature in either Fahrenheit or Centigrade. The processor 704 can also include a memory 718 for storing ranges of temperatures and can compare the currently read temperature to the stored temperatures to determine which element of display 706 to illuminate. The memory 718 can also store one or more previously read temperatures.

The display 706 can include a transparent or translucent lens 722 disposed on the proximal end 712. In one embodiment, the lens 722 is disposed at the far proximal end. Also, in an embodiment, the lens 722 can be circular, elliptical, or any other shape to form the display 706. One or more lighting elements 724, e.g., LEDs, are disposed in the display 706 and under lens 722.

In an embodiment illustrated in FIG. 10b, the display 706 can also include a translucent liquid crystal display (LCD) 720. LCD 720 can be any shape, including rectangular and octagonal and can be a "reverse" LCD. A reverse LCD lights the numerals of the display instead of the background. This increases the visibility and viewing angle of the LCD 720. The LCD can be used to display the actual temperature reading. The LCD 720 can be peripheral to lens 722.

In one embodiment, the light emitting element 724 is capable of generating different colored light to light the display 706. For example, the light emitting element 724 can generate a first, second, and third color. The first color can be green to correspond to a "normal" range of temperatures of the patient. The second color can be yellow and indicate a "warmer" than normal temperature. The third color can be red to indicate a fever.

Other embodiments can use elements from any of the above embodiments with elements of the other embodiments. For example, thermometer 900 an have a memory to store previous temperature reading, thermometers 100, 300, 800 can have patient and location options, and any of the displays can optionally display the actual temperature or only display the colors of the light emitting elements.

Further embodiments include sequentially lighting the display. Thus, as the temperature is being taken, the first light emitting element is illuminated, and remains illuminated even as the second light emitting element is illuminated. This pattern continues until all the light emitting elements are illuminated or the temperature of the patient is reached. Thus, the last light emitting element lit indicates the temperature, while the previous light emitting elements remain lit. In an alternate embodiment, the light emitting element is illuminated when the temperature reading corresponds to that element and then is turned off as the next light emitting elements is illuminated based on the corresponding temperature reading.

Additionally, in the embodiments having both an LCD and light emitting elements, the processor can read the temperature from the temperature sensing element and display the temperature on both the LCD and illuminate the light emitting elements independent of the display on the other. Thus, the light emitting elements can be illuminated based solely on the temperature reading and not based on the reading displayed on the LCD. Thus, this acts as a failsafe wherein if one display is damaged the other can still display an accurate temperature. Alternately, the illumination of the light emitting elements can be based on the temperature displayed on the LCD. This removes the possibility of an inconsistent display wherein the LCD displays a temperature and a light emitting element that does not correspond to that temperature is illuminated. Furthermore, an embodiment only flashes the light emitting elements, the LCD display does not flash in response to the temperature ranges. The LCD can flash to indicate that the temperature is being read, or alternately, that the reading is complete. However, the flashing of the LCD is not related to the magnitude of the temperature being read.

Further embodiments place the light emitting elements anywhere in body section of the thermometer to illuminate the face of the display, including the LCD. Also, an embodiment has both an LCD and light emitting elements in the display, but the elements are separate so that the LCD displays the temperature and is not illuminated by the light emitting elements and the light emitting elements illuminate separate from the LCD.

Additional embodiments include continuously updating which light emitting element to illuminate as the temperature is being read. Thus, as the temperature of the patient is being taken, the light emitting elements can be correspondingly or sequentially lit until the final light emitting element is illuminated in response to the final temperature. Alternately, the light emitting element is not lit until the final temperature reading is determined.

Embodiments can include changing the color scheme to be any range of colors. Alternately, all of the light emitting elements can be one element capable of emitting a range of colors. The light emitting elements can be differing shades of the same base color. For example, the second color can be a darker green than first color. The same shading scheme can be used for third and fourth light emitting elements.

Further, multiple light emitting elements can be illuminated to form the necessary colors. An embodiment can utilize a color scale of blue, green and yellow, where blue and yellow light emitting elements illuminate to form the green color in the display. Further, intensities of certain base colors can be used to form any and every color. For example, combinations of red, blue and green can form many colors of the spectrum and these base colors can be used solely to be combined to form the first through fourth colors of the above embodiments. The base colors themselves may not be a color in the selected range.

While there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

We claim:

1. A thermometer for use with a living being, comprising:
   a temperature sensor;
   a processor determining a temperature of the living being based on the temperature sensor;
   a memory storing:
      information corresponding to a first range of temperatures, the first range indicating a normal temperature; and
      information corresponding to a second range of temperatures, the second range indicating a fever condition;
   a display including a first color light and a second color light for creating light of a first color and a second color; and
   a common housing, said temperature sensor, said processor, said memory, and said display being provided within said common housing;
   wherein the processor accesses the memory and compares the temperature to the temperature range information stored in the memory and illuminates one of the first and the second color light based on the temperature.

2. The thermometer of claim 1, wherein the memory further stores:
   information corresponding to a third range of temperatures, the third range indicating an above normal temperature;
   wherein the display further comprises a third color light for creating light of a third color.

3. The thermometer of claim 1, wherein the processor compares the temperature to the information corresponding to the first range only,
   wherein if the temperature falls within the first range, the first color light is illuminated and if the temperature falls outside the first range, the second color light is illuminated.

4. The thermometer of claim 1, wherein the processor compares the temperature to the information corresponding to the first range and the second range,
   wherein if the temperature falls within the first range, the first color light is illuminated and if the temperature falls within the second range, the second color light is illuminated.

5. A thermometer for use with a living being, comprising:
   a temperature sensor;
   a processor determining a temperature of the living being based on the temperature sensor;
   a display; and
   a backlight for lighting the display, the backlight being activated upon a command from the processor,
   wherein the processor determines whether a decrease in the temperature readings exceeds or is equal to a predetermined threshold in order to activate the backlight.

6. The thermometer of claim 5, wherein the backlight further comprises:
   a light emitting element having a first color and a first activation range; and
   a light emitting element having a second color and a second activation range,
   wherein the processor determines if the temperature falls within one of the first and the second activation range and activates the respective light emitting element.

7. The thermometer of claim 5, wherein the predetermined threshold is a temperature of about 0.1°.

8. A thermometer for use with a living being, comprising:
   a temperature sensor;
   a processor determining a temperature of the living being based on the temperature sensor;
   a display; and
   a backlight for lighting the display, the backlight being activated upon a command from the processor,
   wherein the processor determines whether a decrease in the temperature readings exceeds or is equal to a predetermined threshold in order to activate the backlight,
   wherein the predetermined threshold is based on the number of temperature readings in which the temperature drops, and
   wherein the predetermined threshold is one temperature reading.

9. A method to determine a temperature of a living being, comprising the steps of:
   using a processor to monitor a temperature change indicated by a temperature sensing element;
   detecting a temperature decrease; and
   activating a first color light emitting element to backlight a display if the temperature decrease exceeds or is equal to a predetermined threshold.

10. The method of claim 9, further comprising the step of:
    using the processor to continue monitoring for a temperature change if the temperature decrease does not exceed the predetermined threshold.

11. The method of claim 9, further comprising the steps of:
    detecting a temperature decrease;
    determining a temperature;
    comparing the temperature to a first range, and if the temperature falls within the first range, activating a second color light emitting element to backlight the display; and
    if the temperature does not fall within the first range, then comparing the temperature to a second range, and if the temperature falls within the second range activating a third color light emitting element.

12. The method of claim 9, wherein the predetermined threshold is a temperature of about 0.1°.

13. A method to determine a temperature of a living being, comprising the steps of:
    using a processor to monitor a temperature change indicated by a temperature sensing element;
    detecting a temperature decrease; and
    activating a first color light emitting element to backlight a display if the temperature decrease exceeds or is equal to a predetermined threshold,
    wherein the predetermined threshold is based on the number of temperature readings in which the temperature drops, and
    wherein the predetermined threshold is one temperature reading.

14. A thermometer for use with a living being, comprising:
    a temperature sensor;
    a processor determining a temperature of the living being based on the temperature sensor; and
    a light emitting element for indicating the temperature, the light being activated upon a command from the processor, wherein the processor determines whether a decrease in the temperature readings exceeds or is equal to a predetermined threshold in order to activate the light emitting element.

15. A method to determine a temperature of a living being, comprising the steps of:

using a processor to monitor a temperature change indicated by a temperature sensing element;

detecting a temperature decrease; and activating a first color light emitting element to indicate the temperature if the temperature decrease exceeds or is equal to a predetermined threshold.

\* \* \* \* \*